UNITED STATES PATENT OFFICE.

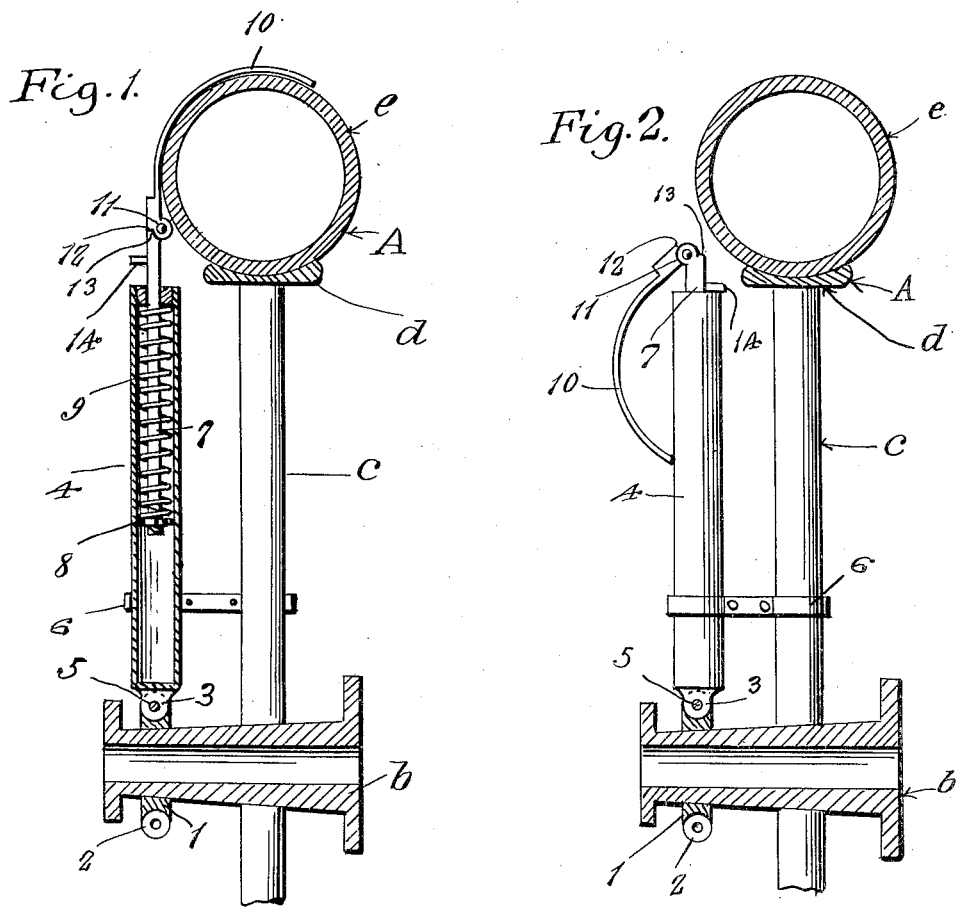
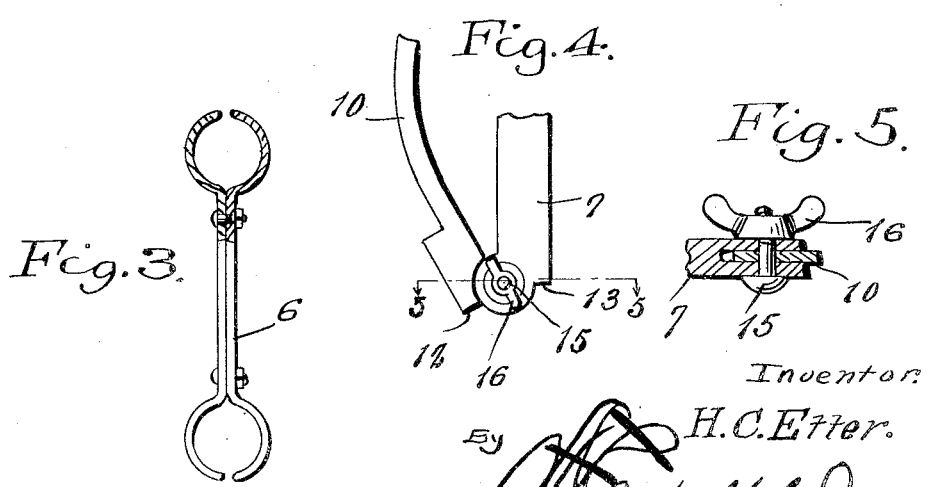

HARRY C. ETTER, OF CHAMBERSBURG, PENNSYLVANIA.

NON-SKID DEVICE.

1,327,538.  Specification of Letters Patent.  Patented Jan. 6, 1920.

Application filed February 8, 1919. Serial No. 275,782.

*To all whom it may concern:*

Be it known that I, HARRY C. ETTER, a citizen of the United States, residing at Chambersburg, in the county of Franklin and State of Pennsylvania, have invented certain new and useful Improvements in Non-Skid Devices; and I do hereby declare the following to be a full, clear, and exact description of the invention, such as will enable others skilled in the art to which it appertains to make and use the same.

This invention relates to non-skid devices and more particularly to a device specially adapted for use in connection with automobiles.

One of the main objects of the invention is to provide a device of the character stated of simple construction and operation which may be readily applied to an automobile wheel of standard construction.

A further object is to provide a device which may be mounted permanently upon the automobile wheel, suitable traction gripping members being carried by this device and means being provided associated therewith for readily and easily holding the traction gripping members in either operative or inoperative position, optionally.

Further objects will appear from the detailed description.

In the drawings:

Figure 1 is a fragmentary section through the wheel of an automobile showing a device constructed in accordance with my invention applied, the traction gripping member being in operative position.

Fig. 2 is a similar view showing the traction gripping member in inoperative position.

Fig. 3 is a detail of the clamp.

Fig. 4 is a fragmentary detail of a modified form of joint for the traction gripping member.

Fig. 5 is a section taken substantially on line 5—5 of Fig. 4.

The automobile wheel designated generally by A may be of any suitable or standard construction and comprises the hub $b$, spokes $c$ radiating therefrom, rim $d$, and tire $e$. A collar 1 is mounted upon the hub $b$ adjacent the outer end thereof, this collar being provided with a plurality of equally spaced radiating ears 2. These ears receive an attaching member 3 which is secured to the inner end of a cylinder 4 disposed radially of the wheel, this member being secured in position by a suitable pin 5. Cylinder 4 is normally maintained in proper relation to spokes $c$ by a two-part clamp 6 provided at its ends with oppositely directed arcuate arms engaging about the spoke and the cylinder, respectively.

A plunger rod 7 is slidable through the outer end of the cylinder. This rod projects a considerable distance into the cylinder and is provided, adjacent its inner end, with a disk 8 secured thereon this disk serving to guide the rod during reciprocation thereof. An expansion coil spring 9 is mounted about the rod and confined between disk 8 and the outer end of the cylinder, this spring acting to normally force the rod inwardly. An arcuate traction gripping member 10 is hingedly secured by a knuckle or rule joint 11 to the outer end of rod 7. As will be noted more clearly from Fig. 1, this member is provided at its hinged end with a shoulder 12 which is adapted to engage the flat outer end portion 13 of rod 7 when member 10 is in operative position, this shoulder and the outer end of the rod coöperating to positively prevent movement of the gripping member, when in operative position, about the pivot of the joint in a direction away from the tire $e$. The gripping member is so shaped as to fit snugly about one side and the tread portion of the tire, being normally held in close engagement therewith by the action of spring 9. When in this position, member 10 provides a very efficient traction gripping means which serves to prevent, to a great extent, skidding or slipping of the tire upon the traction surface. As the rod 7 is mounted for sliding movement radially of the wheel, the traction gripping member 10 is free to move inwardly and outwardly in accordance with distortion of the tire and is at all times in close contact therewith.

Rod 7 is provided with a gripping finger 14 disposed at right angles thereto and positioned an appreciable distance beyond the outer end of the cylinder. By means of this finger, the rod may be readily lifted so as to move the gripping member 10 away from the tire, after which rod 7 is turned through an arc of approximately 180° so that the finger 11 is directed inwardly toward the wheel, as in Fig. 2, spring 9 acting due to its expansive force to move the rod inwardly thus holding the gripping member 10, which is folded inwardly about hinge joint 11 so as to be directed toward the hub $b$, in its innermost or inoperative position. The joint 11 is preferably a friction joint so that the gripping member will be maintained in folded position, though it need not necessarily be so as spring 9 holds the rod 7 inwardly to such an extent as to prevent contact of this gripping member with the traction surface in the event that the gripping member is thrown outwardly by centrifugal force. When desired, a modified form of joint such as that illustrated in Figs. 4 and 5 may be employed, this joint including a headed screw 15 which replaces the usual pintle, a wing nut 16 being threaded upon the projecting end of this screw, the screw and the wing nut coöperating to force the members or elements of the joint into tight frictional engagement, thus locking the gripping member 10 in its inwardly folded or inoperative position.

It will be evident that there may be slight changes made in the details of my invention without departing from the field and scope of the same, and I intend to include all such variations, as fall within the scope of the appended claims, in this application in which a preferred form only of my invention is disclosed.

What I claim is:

1. In a device of the character described, the combination with an automobile wheel, of a cylinder, means for securing said cylinder to the wheel radially thereof, a rod operable through the outer end of the cylinder and projecting into the same, means for normally forcing said rod inwardly, a traction gripping member carried by the rod at the outer end thereof and adapted to engage about the tread portion of a tire mounted upon the wheel, and hinge connections between the outer end of said rod and said gripping member adapted to positively limit turning of the gripping member about its hinge axis in one direction while permitting said member to be folded inwardly in the other direction away from the tire when turned out of engagement therewith.

2. In a device of the character described, a cylinder, means for securing the same to an automobile wheel radially thereof, a rod operable through the outer end of the cylinder, a disk secured on said rod adjacent the inner end thereof, an expansion coil spring confined between said disk and the outer end of the cylinder and acting to force said rod inwardly, an arcuate traction gripping member adapted to fit about the tread portion of a tire, and hinge connections between said member and the outer end of the rod adapted to positively limit turning of said member in one direction about its hinge axis away from the tire when in operative position while permitting said member to be turned in the other direction away from the tire when out of engagement therewith.

3. In a device of the character described, a cylinder, means for securing the same to an automobile wheel radially thereof, a rod operable through the outer end of the cylinder, a disk secured on said rod adjacent the inner end thereof, an expansion coil spring confined between said disk and the outer end of the cylinder and acting to force said rod inwardly, an arcuate traction gripping member adapted to fit about the tread portion of a tire, hinge connections between said member and the outer end of the rod adapted to positively limit turning of said member in one direction about its hinge axis away from the tire when in operative position while permitting said member to be folded inwardly in the other direction away from the tire when out of engagement therewith, and means associated with said hinge connection for locking the gripping member in its inwardly folded inoperative position.

In testimony whereof I affix my signature in presence of two witnesses.

HARRY C. ETTER.

Witnesses:
CHARLES M. ANKERBRAND,
JOHN L. ETCHBERGER.